Oct. 3, 1944.  E. O. KUNKEL  2,359,369
THROTTLE VALVE
Filed Oct. 12, 1943  2 Sheets-Sheet 1
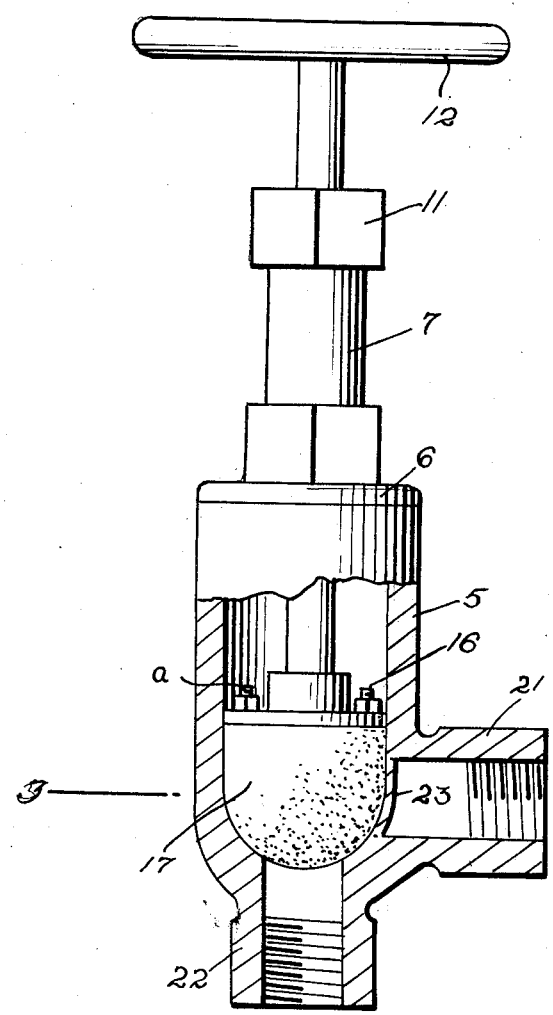
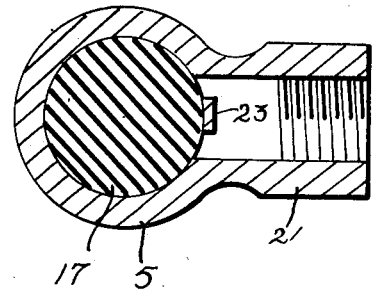
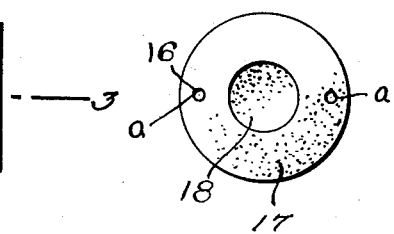
Inventor
ELZA O. KUNKEL
By *Clarence A. O'Brien
and Harvey B. Jacobson*
Attorneys Oct. 3, 1944.   E. O. KUNKEL   2,359,369
THROTTLE VALVE
Filed Oct. 12, 1943   2 Sheets-Sheet 2
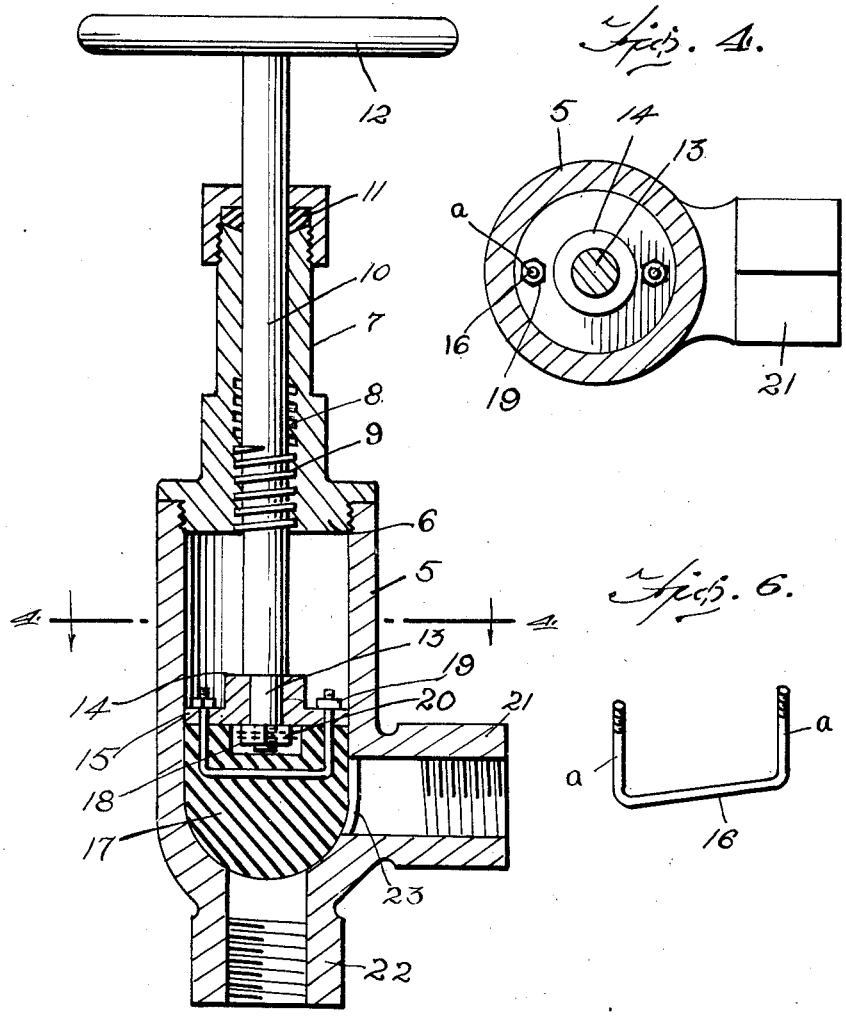
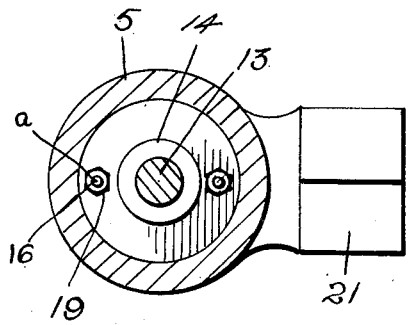
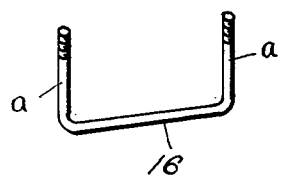
Inventor
ELZA O. KUNKEL
By Clarence A. O'Brien
and Harvey B. Jacobson
Attorneys Patented Oct. 3, 1944

2,359,369

UNITED STATES PATENT OFFICE 2,359,369

THROTTLE VALVE

Elza O. Kunkel, Mount Vernon, Ill., assignor of one-half to J. A. Matthews, Centralia, Ill.

Application October 12, 1943, Serial No. 505,989

1 Claim. (Cl. 251—27)

This invention relates to new and useful improvements in valves such as are known as "L throttle valves" for low pressure fluids in which a single valve element is employed for operation against two seats simultaneously.

The principal object of the present invention is to provide a valve having a valve element capable of efficiently operating against two valve seats simultaneously to shut off the passage of fluid therethrough.

Other objects and advantages of the invention will become apparent to the reader of the following description.

In the drawings:

Figure 1 represents a side elevational view of the improved valve with a portion broken away to disclose the valve element in seated position.

Figure 2 is a vertical sectional view through the improved valve showing the valve element in section.

Figure 3 is a sectional view taken on the line 3—3 of Figure 1.

Figure 4 is a section taken on the line 4—4 of Figure 2.

Figure 5 is a top plan view of the valve element.

Figure 6 is a perspective view of the U-shaped yoke.

Referring to the drawings, wherein like numerals designate like parts, it can be seen that numeral 5 denotes the body of the valve having an internally threaded upper portion for receiving the depending threaded portion 6 of a riser 7 which has internal threads 8 for receiving the threads 9 of a valve stem 10, which extends upwardly through a packing gland 11 and is equipped with a hand wheel or knob 12.

The lower end of the stem 10 has a reduced extension 13 which is disposed in the smoothly bored neck 14 of a plate 15, which plate has a pair of openings therein for receiving the upstanding threaded leg portions a, a of a U-shaped yoke 16 which has its bight portion embedded in a resilient hemispherical-shaped valve element 17, this valve element being preferably of soft rubber and having a pocket 18 in the top thereof. The legs a, a are disposed through the openings in the plate 15 and are equipped with nuts 19. The lower end of the reduced portion 13 of the stem 10 is equipped with a nut 20. Thus, it can be seen that the lower end of the stem 10 is swivelly connected to the valve element 17. The valve body 5 has an inlet 21 and an outlet 22, the side of the valve element 17 being adapted to close off the inlet 21 and the bottom of the valve to close off the outlet 22. A bridge member 23 is provided over the seat of the inlet 21 so that when the element 17 has been expanded by reason of the stem 10 being fed downwardly, it will not bulge too far into the inlet 21.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A valve of the class described, comprising a valve body having a side inlet and bottom outlet at its lower end and provided with a valve chamber of larger diameter than and in alignment with said bottom outlet, a riser on the upper end of the valve body, a valve stem threaded through said riser and having a reduced lower end, a resilient substantially hemispherical valve head slidably fitted in said valve chamber and having a flat top surface, said valve head being provided with a central recess in its upper end, a U-shaped yoke having its bight and the lower portions of its legs embedded in said valve head, the upper free end portions of said legs projecting upwardly from the valve head, a plate seated on the top of the valve head and having a central opening rotatably receiving the reduced lower end of the valve stem, a nut threaded on the lower end of the valve stem beneath said plate and disposed in the central recess of the valve head, said plate having further openings receiving the projecting end portions of said yoke legs, nuts threaded on said projecting end portions of the yoke legs above said plate, the lower end of the valve head being adapted to seat at and close said outlet and to be compressed and laterally expanded when so seated to simultaneously close said inlet, and a bridge member extending across said inlet to prevent undue lateral expansion of the valve head into said inlet.

ELZA O. KUNKEL.